US012688563B2

(12) United States Patent
Xu et al.

(10) Patent No.: US 12,688,563 B2
(45) Date of Patent: Jul. 21, 2026

(54) IMAGE PROCESSING CIRCUIT AND IMAGE PROCESSING METHOD

(71) Applicant: SigmaStar Technology Ltd., Xiamen (CN)

(72) Inventors: Jiang He Xu, Shanghai (CN); Qin Wei She, Shanghai (CN); Yan Xiong Wu, Shanghai (CN)

(73) Assignee: SIGMASTAR TECHNOLOGY LTD., Xiamen (CN)

( * ) Notice: Subject to any disclaimer, the term of this patent is extended or adjusted under 35 U.S.C. 154(b) by 244 days.

(21) Appl. No.: 18/762,691

(22) Filed: Jul. 3, 2024

(65) Prior Publication Data

US 2025/0029219 A1     Jan. 23, 2025

(30) Foreign Application Priority Data

Jul. 19, 2023     (CN) ......................... 202310889672.1

(51) Int. Cl.
G06T 5/80          (2024.01)
G06T 5/20          (2006.01)

(52) U.S. Cl.
CPC . G06T 5/80 (2024.01); G06T 5/20 (2013.01)

(58) Field of Classification Search
CPC .... G06T 5/80; G06T 5/20; G06T 1/60; G06T 1/20; G06T 11/40; G06T 3/40;

(Continued)

(56) References Cited

U.S. PATENT DOCUMENTS

| | | | | |
|---|---|---|---|---|
| 7,719,539 B2 * | 5/2010 | Morphet | ................ | G09G 5/363 |
| | | | | 345/553 |
| 8,194,137 B2 * | 6/2012 | Chiang | ................ | H04N 23/661 |
| | | | | 348/207.1 |

(Continued)

FOREIGN PATENT DOCUMENTS

CN          114549851 A          5/2022

OTHER PUBLICATIONS

OA letter of a counterpart TW application (appl. No. 112127328) mailed on Mar. 7, 2024. Summary of the TW OA letter: (1) Claim(s) 1, 6-8 is/are rejected under Patent Law Article 22(2) as allegedly being unpatentable over reference 1 (CN 114549851A). (2) Claim(s) 11 and 16 is/are rejected under Patent Law Article 22(2) as allegedly being unpatentable over reference 1 (CN 114549851A).

*Primary Examiner* — Michael S Osinski
(74) *Attorney, Agent, or Firm* — WPAT, PC

(57)          ABSTRACT

An image processing method is applied to an image processing circuit including a first application circuit and a second application circuit. The image processing circuit is coupled to a memory. The method includes the following steps: reading, by the first application circuit, a first image from the memory; processing, by the first application circuit, the first image to generate a part of a second image and progress information corresponding to the part; storing, by the first application circuit, the part of the second image in the memory; sending, by the first application circuit, the progress information; receiving, by the second application circuit, the progress information; reading, by the second application circuit, the part of the second image from the memory according to the progress information; and processing, by the second application circuit, the part of the second image.

16 Claims, 10 Drawing Sheets

(58) Field of Classification Search
CPC ........ G06T 5/50; H04N 23/80; H04N 5/2628;
H04N 1/00915; G06F 9/4881; G06F
12/02; G06F 2209/509; G16H 30/40
See application file for complete search history.

(56) References Cited

U.S. PATENT DOCUMENTS

| | | | |
|---|---|---|---|
| 9,609,173 B2 * | 3/2017 | Katsunoi | H04N 1/46 |
| 10,999,497 B1 * | 5/2021 | Singh | H04N 23/665 |
| 2005/0190271 A1 * | 9/2005 | Chiang | H04N 23/661 |
| | | | 348/222.1 |
| 2008/0068629 A1 * | 3/2008 | Oyanagi | H04N 1/00278 |
| | | | 358/1.9 |
| 2013/0215020 A1 * | 8/2013 | Matsuda | G06F 3/03 |
| | | | 345/157 |
| 2013/0246650 A1 * | 9/2013 | Tsuboki | H04L 49/112 |
| | | | 709/236 |
| 2016/0165222 A1 * | 6/2016 | Yamaoka | H04N 13/359 |
| | | | 348/51 |
| 2017/0337655 A1 * | 11/2017 | Chua | H04N 19/00 |
| 2020/0134799 A1 * | 4/2020 | Xie | G06T 1/60 |
| 2021/0037162 A1 * | 2/2021 | Kawaguchi | H04N 1/2125 |
| 2023/0334621 A1 * | 10/2023 | Landvater | G06T 1/60 |
| 2023/0385102 A1 * | 11/2023 | Nandan | G06F 9/30189 |
| 2024/0078969 A1 * | 3/2024 | Lin | G09G 3/2007 |
| 2025/0005724 A1 * | 1/2025 | Hara | G06T 3/00 |

* cited by examiner

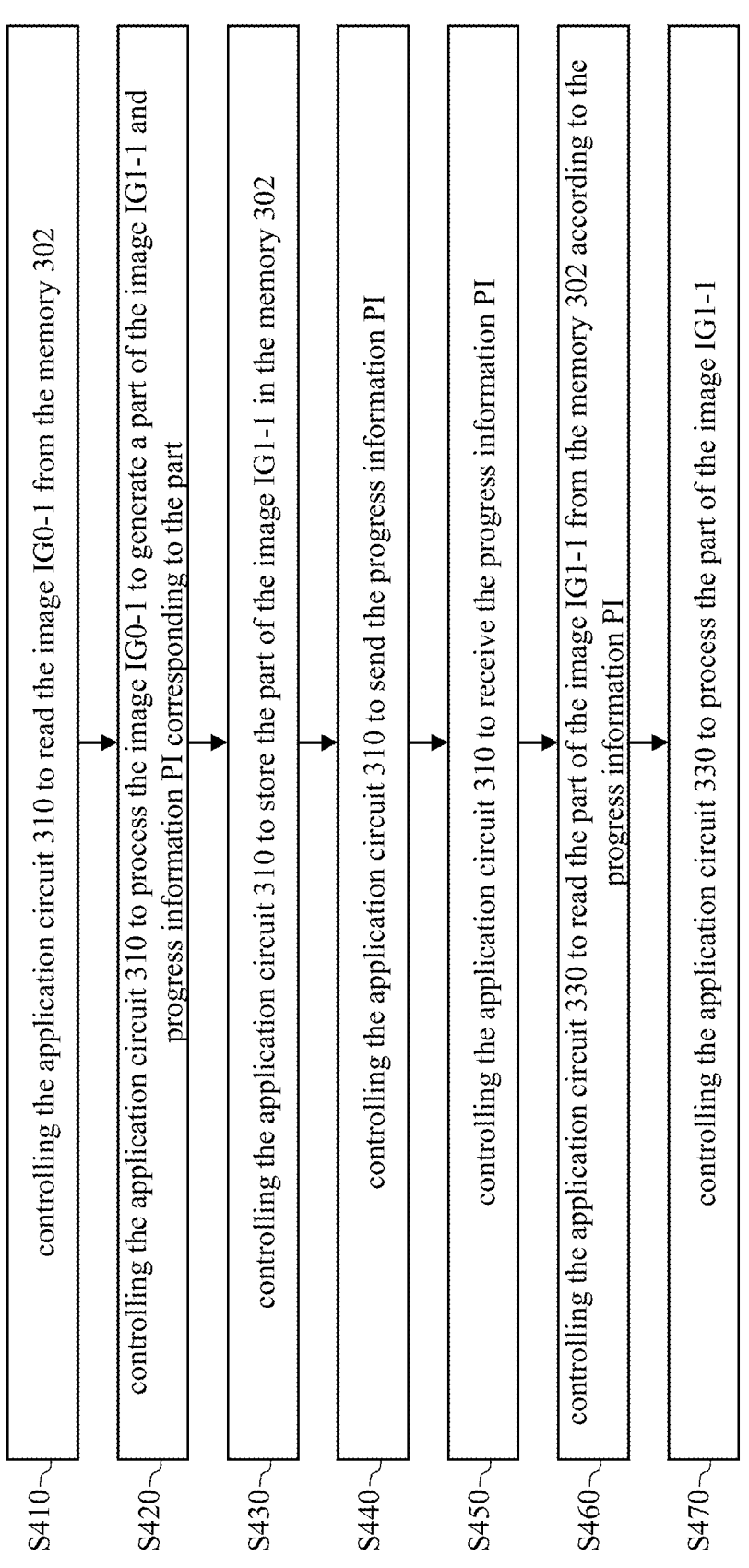

S410 — controlling the application circuit 310 to read the image IG0-1 from the memory 302

S420 — controlling the application circuit 310 to process the image IG0-1 to generate a part of the image IG1-1 and progress information PI corresponding to the part S430 — controlling the application circuit 310 to store the part of the image IG1-1 in the memory 302

S440 — controlling the application circuit 310 to send the progress information PI S450 — controlling the application circuit 310 to receive the progress information PI S460 — controlling the application circuit 330 to read the part of the image IG1-1 from the memory 302 according to the progress information PI S470 — controlling the application circuit 330 to process the part of the image IG1-1

FIG. 4

IMAGE PROCESSING CIRCUIT AND IMAGE PROCESSING METHOD

This application claims the benefit of China application Serial No. 202310889672.1, filed on Jul. 19, 2023, the subject matter of which is incorporated herein by reference.

BACKGROUND OF THE INVENTION

1. Field of the Invention

The present invention generally relates to image processing, and, more particularly, to an image processing circuit and an image processing method.

2. Description of Related Art

Reference is made to FIG. 1, which is a functional block diagram of a conventional electronic device. The electronic device 100 includes an application circuit 110, a memory 120, and an application circuit 130. The application circuit 110 and the application circuit 130 are coupled to the memory 120.

The application circuit 110 includes a direct memory access (DMA) circuit (read) 112, a processing circuit 114, and a DMA circuit (write) 116. Under the control of the processing circuit 114, the DMA circuit (read) 112 reads the image IMG0 from the memory 120. The processing circuit 114 processes the image IMG0 to generate the image IMG1 and controls the DMA circuit (write) 116 to write the image IMG1 into the memory 120.

The application circuit 130 includes a DMA circuit (read) 132, a processing circuit 134, and a DMA circuit (write) 136. Under the control of the processing circuit 134, the DMA circuit (read) 132 reads the image IMG1 from the memory 120. The processing circuit 134 processes the image IMG1 to generate the image IMG2 and controls the DMA circuit (write) 136 to write the image IMG2 into the memory 120.

Reference is made to FIG. 2, which is a timing diagram of a conventional electronic device 100. Reference is made to both FIG. 1 and FIG. 2. It is assumed here that the application circuit 110 and the application circuit 130 share the first memory block MB0 and the second memory block MB1 of the memory 120. The task TSK0 and the task TSK1 are tasks of the application circuit 110 and the application circuit 130 respectively and are generated by the computing unit (not shown) of the electronic device 100. At the time point T0, the first task TSK0-0 of the application circuit 110 and the first task TSK1-0 of the application circuit 130 are generated, and then the application circuit 110 starts processing the task TSK0-0 (step S215 in which the generated image IMG1 is written into the first memory block MB0), but at this time the application circuit 130 has not yet started processing the task TSK1-0.

The application circuit 110 finishes processing the image IMG0 at the time point T1 (i.e., the complete image IMG1 is generated). When the task TSK0-0 is informed that the application circuit 110 has finished processing the image IMG0 (step S220), the computing circuit of the electronic device 100 terminates the task TSK0-0 and wakes up the task TSK1-0 (step S225, at the time point T2). After the task TSK1-0 is awakened, the task TSK1-0 provides the image IMG1 in the first memory block MB0 to the application circuit 130, and the application circuit 130 starts processing the task TSK1-0 (step S230, at the time point T3). It should be noted that the task TSK1-0 is generated at the time point T0 but is not processed until the time point T3. This waiting time (approximately equal to the duration of the task TSK0-0, that is, approximately equal to the time that the application circuit 110 takes to process an image) is the hardware gap HWG, and the application circuit 130 is idle in the hardware gap HWG, resulting in a waste of system resources.

Between the time point T3 and the time point T4, the task TSK0-1 and the task TSK1-0 are in a substantially parallel state (i.e., the application circuit 110 writes the next image IMG1 into the second memory block MB1, and the application circuit 130 writes the image IMG2 into the first memory block MB0). However, because the processing speed of the application circuit 110 is different from that of the application circuit 130 (it is assumed here that the processing speed of the application circuit 110 is greater than that of the application circuit 130), the task TSK0-2, although ready at the time point T4, cannot commence immediately since the application circuit 130 is still using the first memory block MB0 at this time. The task TSK0-2 must wait until the task TSK1-0 is completed (i.e., after the first memory block MB0 is released, approximately at the time point T5) to begin processing. This waiting time (approximately equal to T5-T4) is the software gap SWG. The application circuit 110 is idle in the software gap SWG, resulting in a waste of system resources.

The waste of system resources caused by the hardware gap HWG and the software gap SWG leads to a degradation in the performance of the electronic device 100.

SUMMARY OF THE INVENTION

In view of the issues of the prior art, an object of the present invention is to provide an image processing circuit and an image processing method, so as to make an improvement to the prior art.

According to one aspect of the present invention, an image processing circuit is provided. The image processing circuit is coupled to a memory and includes a first application circuit and a second application circuit. The first application circuit includes a first memory access circuit, a first processing circuit, a second memory access circuit, and a notification sending circuit. The first memory access circuit is used to read a first image from the memory. The first processing circuit is coupled to the first memory access circuit and configured to process the first image to generate a part of a second image and progress information corresponding to the part. The second memory access circuit is coupled to the first processing circuit and configured to store the part of the second image in the memory. The notification sending circuit is coupled to the first processing circuit and configured to send the progress information. The second application circuit includes a notification receiving circuit, a third memory access circuit, and a second processing circuit. The notification receiving circuit is coupled to the notification sending circuit and configured to receive the progress information. The third memory access circuit is coupled to the notification receiving circuit and configured to read the part of the second image from the memory according to the progress information. The second processing circuit is coupled to the third memory access circuit and configured to process the part of the second image.

According to another aspect of the present invention, an image processing method is provided. The image processing method is applied to an image processing circuit including a first application circuit and a second application circuit. The image processing circuit is coupled to a memory. The method includes the following steps: reading, by the first application circuit, a first image from the memory; processing, by the first application circuit, the first image to generate a part of a second image and progress information corresponding to the part; storing, by the first application circuit, the part of the second image in the memory; sending, by the first application circuit, the progress information; receiving, by the second application circuit, the progress information; reading, by the second application circuit, the part of the second image from the memory according to the progress information; and processing, by the second application circuit, the part of the second image.

The technical means embodied in the embodiments of the present invention can solve at least one of the problems of the prior art. Therefore, compared to the prior art, the present invention can improve the performance of electronic devices.

These and other objectives of the present invention no doubt become obvious to those of ordinary skill in the art after reading the following detailed description of the preferred embodiments with reference to the various figures and drawings.

BRIEF DESCRIPTION OF THE DRAWINGS

FIG. 4 is a flowchart of an image processing method according to an embodiment of the present invention.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an image processing circuit and an image processing method. On account of that some or all elements of the image processing circuit could be known, the detail of such elements is omitted provided that such detail has little to do with the features of this disclosure, and that this omission nowhere dissatisfies the specification and enablement requirements. Some or all of the processes of the image processing method may be implemented by software and/or firmware and can be performed by the image processing circuit or its equivalent. A person having ordinary skill in the art can choose components or steps equivalent to those described in this specification to carry out the present invention, which means that the scope of this invention is not limited to the embodiments in the specification.

Figure 1:
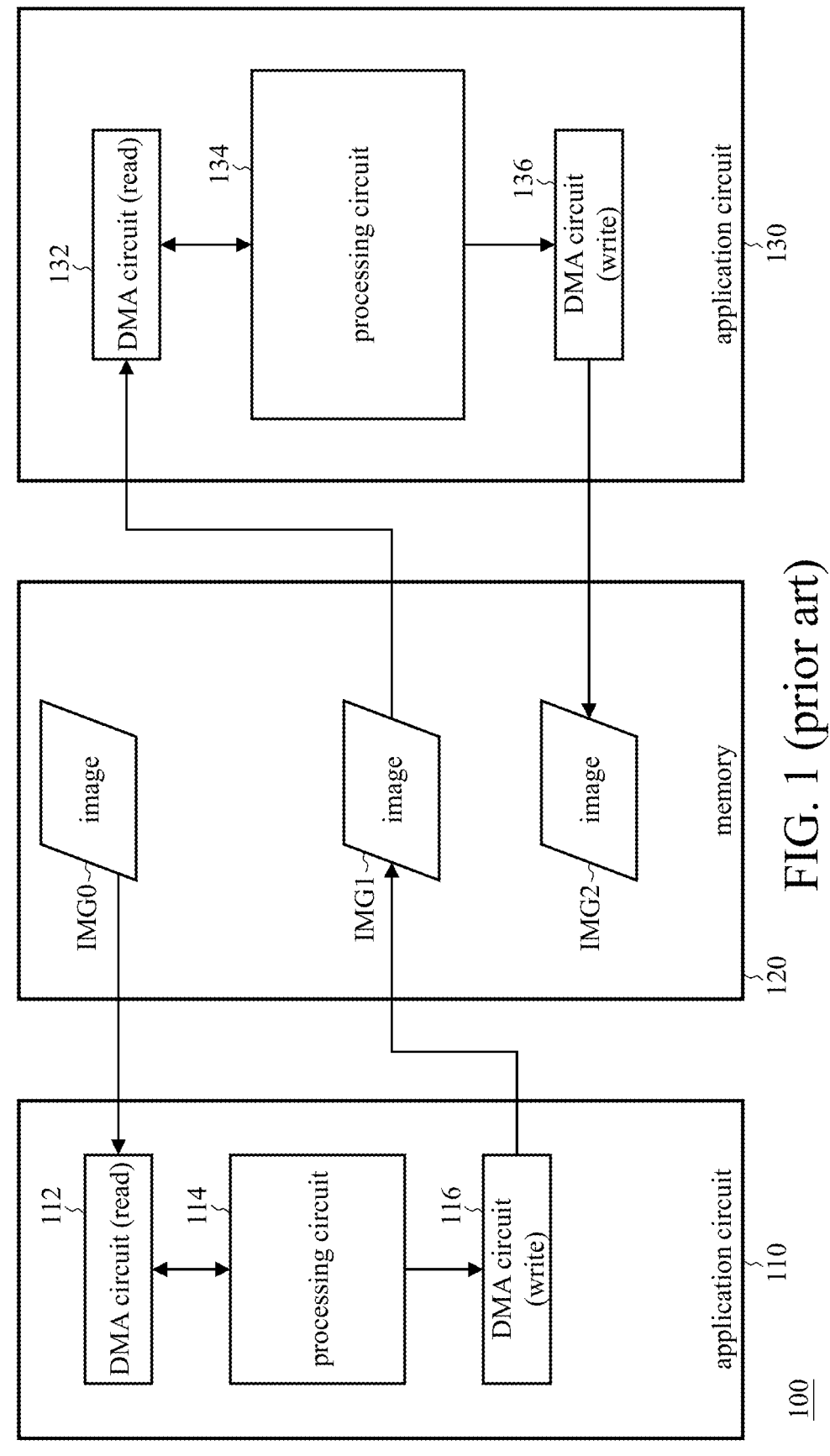
FIG. 1 is a functional block diagram of a conventional electronic device.
Figure 2:
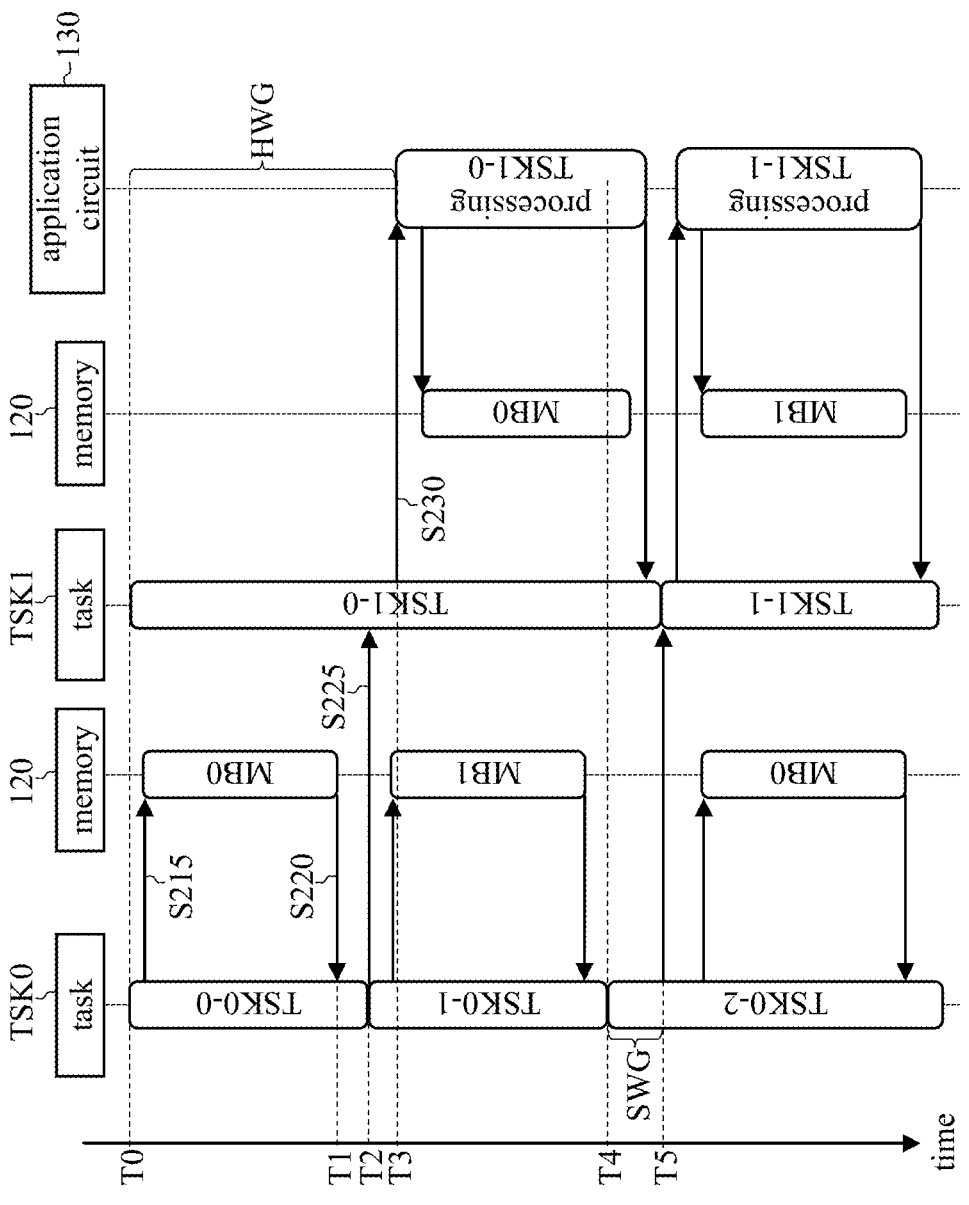
FIG. 2 is a timing diagram of a conventional electronic device.
Figure 3:
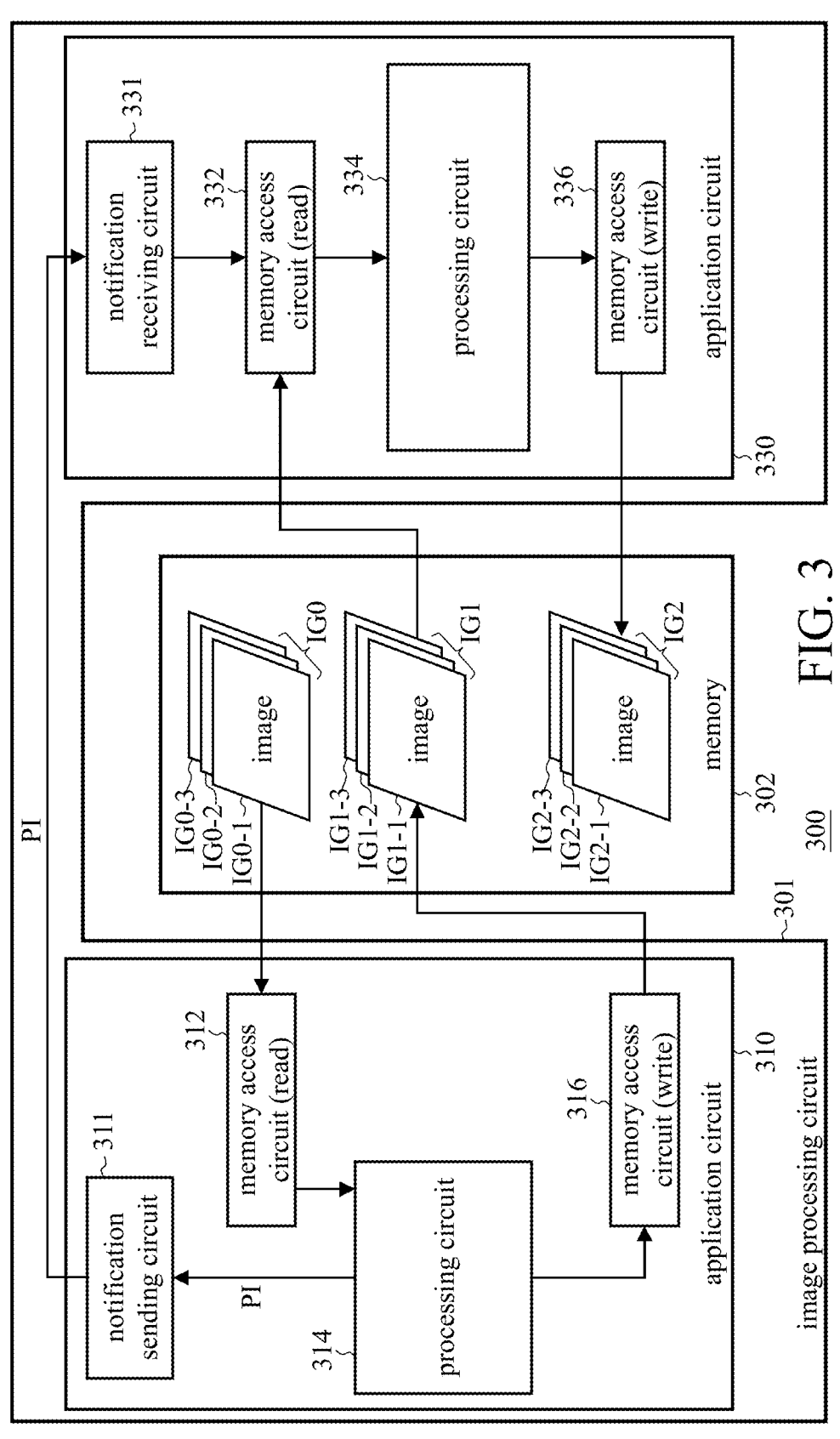
FIG. 3 is a functional block diagram of an electronic device according to an embodiment of the present invention.

Reference is made to FIG. 3, which is a functional block diagram of an electronic device according to an embodiment of the present invention. The electronic device 300 includes an image processing circuit 301 and a memory 302. The image processing circuit 301 includes an application circuit 310 and an application circuit 330. The application circuit 310 and the application circuit 330 are coupled to the memory 302.

The application circuit 310 includes a notification sending circuit 311, a memory access (e.g., direct memory access, DMA) circuit (read) 312, a processing circuit 314, and a memory access circuit (write) 316.

The application circuit 330 includes a notification receiving circuit 331, a memory access circuit (read) 332, a processing circuit 334, and a memory access circuit (write) 336.

The memory 302 stores the image group IG0, the image group IG1, and the image group IG2. Each image group contains multiple images (each image may be a frame). The image group IG0 is generated by a preceding circuit (not shown) of the image processing circuit 301. In the kth operation round, the application circuit 310 processes an image IG0-1 from the image group IG0 to generate one image IG1-1 in the image group IG1. Subsequently, the application circuit 330 processes the image IG1-1 from the image group IG1 to generate an image IG2-1 in the image group IG2. Similarly, in the $(k+1)^{th}$ (or $(k+2)^{th}$) operation round, the application circuit 310 processes the image IG0-2 (or the image IG0-3) to generate the image IG1-2 (or the image IG1-3), and the application circuit 330 processes the image IG1-2 (or the image IG1-3) to generate the image IG2-2 (or the image IG2-3).

In some embodiments, the application circuit 310 outputs the results in units of lines, for example, outputs one line of the image IG1-1 at a time.

Reference is made to FIG. 4, which is a flowchart of an image processing method according to an embodiment of the present invention. Reference is made to both FIG. 3 and FIG. 4 for the following discussion. In some embodiments, the process depicted in FIG. 4 can be executed under the control of a computing unit (e.g., a central processor or a microcontroller, not shown) of the electronic device 300. The computing unit controls the application circuits 310 and 330 by configuring their respective registers. The process depicted in FIG. 4 includes the following steps.

Step S410: controlling the application circuit 310 (more specifically, the memory access circuit (read) 312) to read the image IG0-1 from the memory 302.

Figure 5:
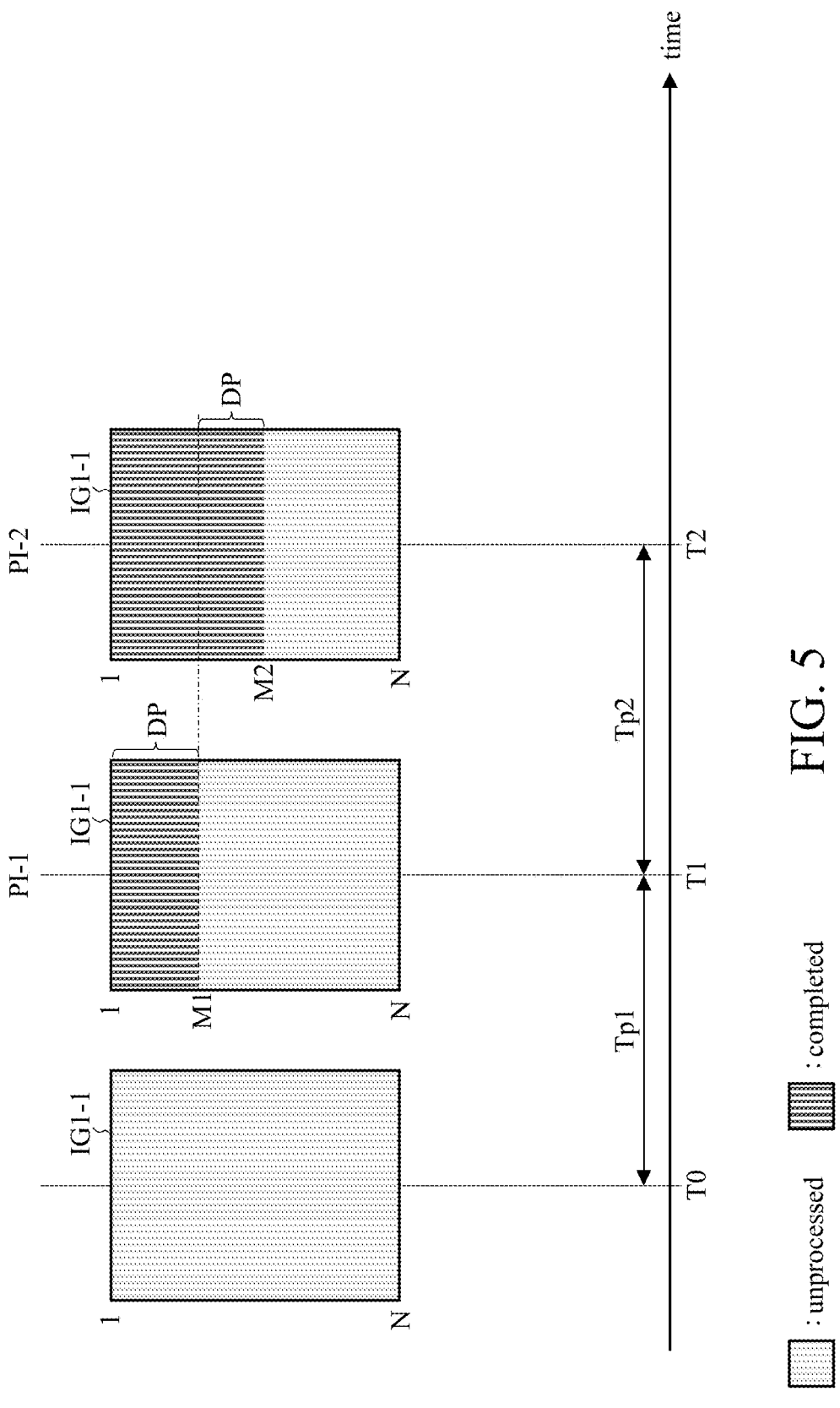
FIG. 5 is a schematic diagram illustrating the generation of images by an application circuit of the present invention.

Step S420: controlling the application circuit 310 (more specifically, the processing circuit 314) to process the image IG0-1 to generate a part of the image IG1-1 and progress information PI corresponding to the part of the image IG1-1. Reference is made to FIG. 5, which is a schematic diagram illustrating the generation of the image IG1-1 by the application circuit 310. The image IG1-1 contains N lines of pixels. At the time point TO, the application circuit 310 begins to process the image IG0-1 (at this time, no line of pixels in the image IG1-1 has yet been generated). At the time point T1, the application circuit 310 has generated M11 lines of the image IG1-1 (i.e., the newly completed part DP in the image IG1-1 includes this M1 lines of pixels, where M1 is smaller than N), and the progress information PI-1 generated by the processing circuit 314 at the time point T1 contains M1 (i.e., the last line of pixels in the newly completed part DP) or information equivalent to M1 (for example, the number of pixels contained in the newly completed part DP). In some embodiments, the processing circuit 314 continuously generates the image IG1-1 and synchronously updates the progress information PI.

Step S430: controlling the application circuit 310 (more specifically, the memory access circuit (write) 316) to store the newly completed part DP of the image IG1-1 in the memory 302.

Step S440: controlling the application circuit 310 (more specifically, the notification sending circuit 311) to send the progress information PI to the application circuit 330.

Step S450: controlling the application circuit 330 (more specifically, the notification receiving circuit 331) to receive the progress information PI.

Step S460: controlling the application circuit 330 (more specifically, the memory access circuit (read) 332) to read the newly completed part DP of the image IG1-1 from the memory 302 according to the progress information PI. For example (refer to FIG. 5), if the memory access circuit (read) 332 reads the M1 lines of pixels (i.e., the newly completed part DP) from the memory 302 at the time point T1 according to the current progress information PI (i.e., the progress information PI-1), then at the time point T2, the memory access circuit (read) 332 reads M2-M1 line(s) of pixels from the memory 302 according to the current progress information PI (i.e., the progress information PI-2 which contains M2) and the current processing progress of the application circuit 330 (i.e., M1 lines, as the memory access circuit (read) 332 has already read the M1 lines of the image IG1-1 at the time point T1). That is to say, the notification receiving circuit 331 may compare the progress information PI with the current processing progress of the application circuit 330, and then control the memory access circuit (read) 332 to read the newly completed part DP of the image IG1-1 according to the comparison result.

Step S470: controlling the application circuit 330 (more specifically, the processing circuit 334) to process the newly completed part DP of the image IG1-1.

The electronic device 300 repeats the process depicted in FIG. 4. More specifically, the application circuit 310 on the one hand generates more newly completed parts DP of the image IG1-1 (e.g., refer to FIG. 5, the completed part of the image IG1-1 changes from M1 lines at the time point T1 to M2 lines at the time point T2, where M2>M1) and updates the progress information PI (e.g., updates the progress information PI from PI-1 to PI-2) (corresponding to steps S410 through S440); on the other hand, the application circuit 330 obtains more pixels of the image IG1-1 according to the progress information PI and processes the newly completed part DP of the image IG1-1 to generate the image IG2-1 (corresponding to steps S450 through S470).

Figure 6:
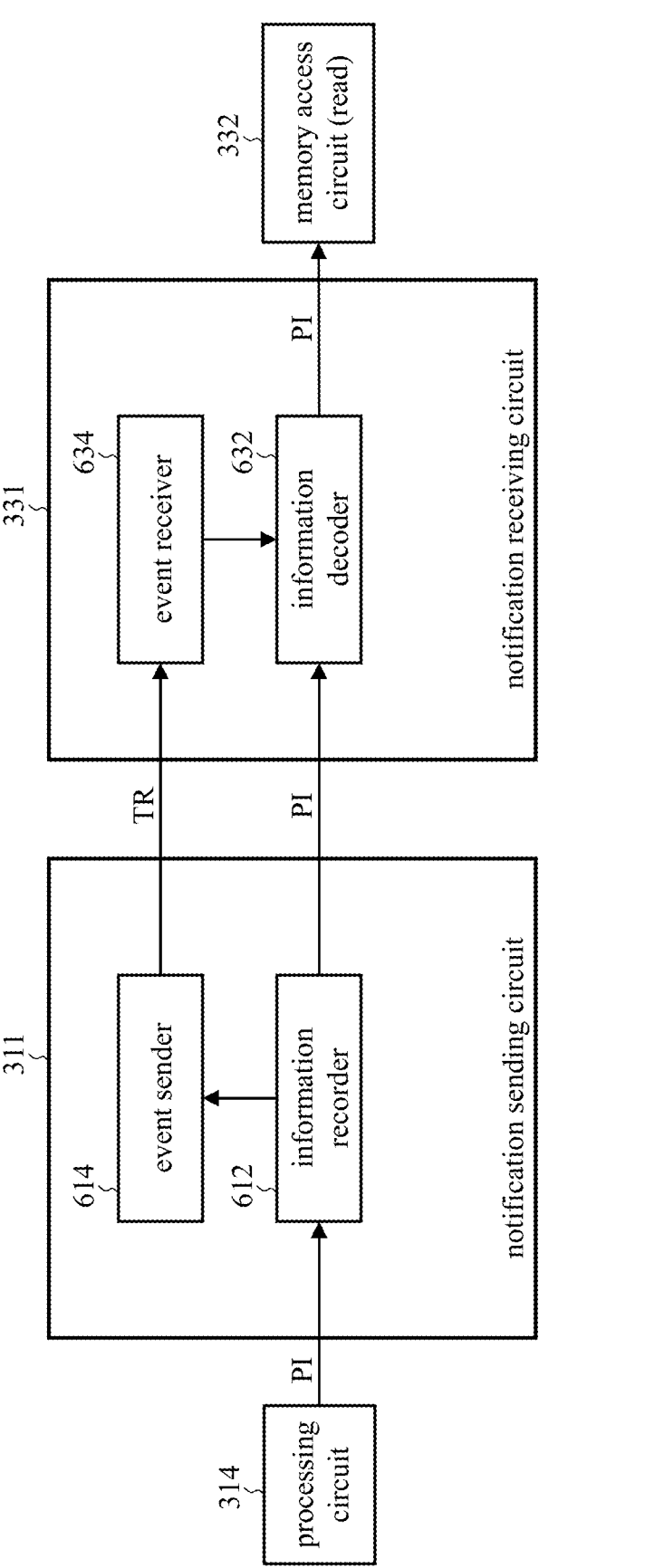
FIG. 6 is a functional block diagram of a notification sending circuit and a notification receiving circuit according to an embodiment of the present invention.

Reference is made to FIG. 6, which is a functional block diagram of the notification sending circuit 311 and the notification receiving circuit 331 according to an embodiment of the present invention. The notification sending circuit 311 includes an information recorder 612 and an event sender 614. The notification receiving circuit 331 includes an information decoder 632 and an event receiver 634. The information recorder 612 is coupled or electrically connected to the processing circuit 314, the event sender 614, and the information decoder 632. The information decoder 632 is coupled or electrically connected to the information recorder 612, the event receiver 634, and the memory access circuit (read) 332. The event sender 614 is coupled or electrically connected to the event receiver 634.

The processing circuit 314 continuously updates the progress information PI and provides the progress information PI to the information recorder 612. When a preset condition is met, the information recorder 612 controls the event sender 614 to send a trigger signal TR to the event receiver 634. In response to the trigger signal TR, the event receiver 634 controls the information decoder 632 to decode the progress information PI, and the information decoder 632 controls the memory access circuit (read) 332 to read the newly completed part DP of the image IG1-1 from the memory 302 according to the progress information PI and the current processing progress of the application circuit 330 (i.e., the number of lines of the image IG1-1 that have been processed by the processing circuit 334). Because the memory access circuit (read) 332 is controlled by the information decoder 632, the information decoder 632 knows the current progress of the application circuit 330. For example (refer to FIG. 5), if the current processing progress of the application circuit 330 is M1 lines, and the information decoder 632 learns from the progress information PI that the current processing progress of the application circuit 310 is M2 lines, then the information decoder 632 controls the memory access circuit (read) 332 to read more pixels of the image IG1-1 (e.g., the newly completed part DP) according to the difference between the current processing progress of the application circuit 310 and that of the application circuit 330 (i.e., M2-M1 line(s) of pixels).

The above-mentioned preset condition may be: (1) when the processing circuit 314 newly generates a preset number of lines of the image IG1-1; or (2) when a predetermined time elapses. The above preset conditions are discussed below with reference to FIG. 5, where it is assumed that the notification sending circuit 311 sends the progress information PI-1 and the progress information PI-2 at the time point T1 and the time point T2 respectively, and the notification sending circuit 311 does not send other progress information PI between the time points TO and T1 and the time points T1 and T2.

With respect to the preset condition (1), whenever the processing circuit 314 generates the preset number of lines of the image IG1-1, the notification sending circuit 311 sends the progress information PI. In other words, M2=2*M1 in FIG. 5 (i.e., the preset number of lines is M1 lines). In this case, the time length Tp1 may or may not be equal to the time length Tp2.

With respect to the preset condition (2), the processing circuit 314 generates the progress information PI every predetermined time. That is, the time length Tp1 in FIG. 5 is equal to the time length Tp2 (i.e., the predetermined time). In this case, M2 may or may not be equal to 2*M1.

Continuing with FIGS. 5 and 6. In some embodiments, the information decoder 632 controls the memory access circuit (read) 332 to read more pixels from the image IG1-1 for processing by the processing circuit 334 only when the difference in the current progresses (i.e., the M2-M1 line(s) of pixels) exceeds a threshold. The threshold is illustrated below with examples.

In some embodiments, the trigger signal TR may be a hardware interrupt, and the hardware interrupt does not need to be processed by the interrupt management circuit (not shown) of the image processing circuit 301. Therefore, the response speed of the circuit is increased, and the complexity of the interrupt management circuit is reduced.

Figure 7:
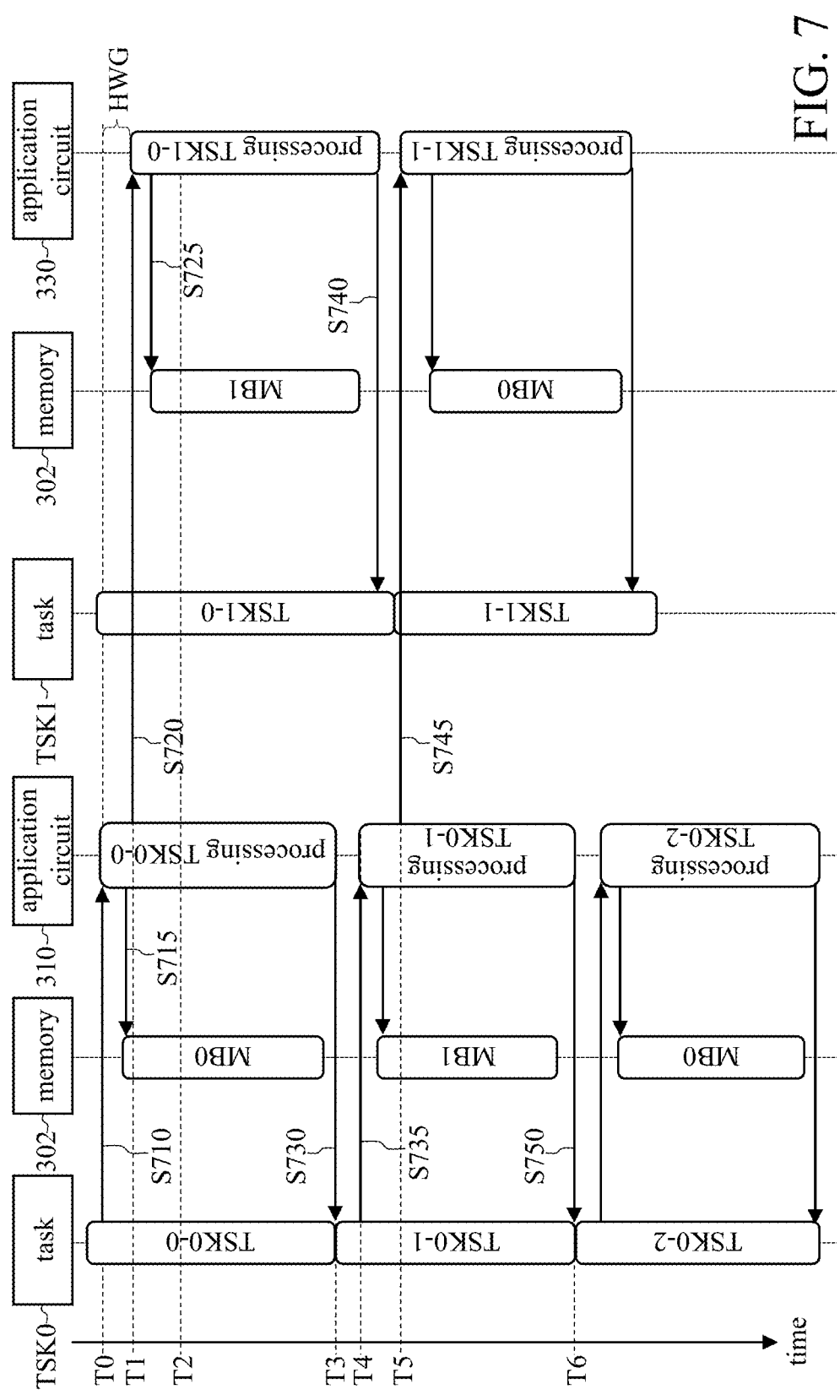
FIG. 7 is a timing diagram of an electronic device of the present invention.

Reference is made to FIG. 7, which is a timing diagram of the electronic device 300 of the present invention. Reference is made to both FIGS. 3 and 7 for the following discussion. It is assumed that the application circuit 310 and the application circuit 330 share the first memory block MB0 and the second memory block MB1 (both of which are not shown in FIG. 3) of the memory 302. The task TSK0 (including multiple subtasks TSK0-0, TSK0-1, TSK0-2, . . . ) and the task TSK1 (including multiple subtasks TSK1-0, TSK1-1, . . . ) are generated by the computing unit of the electronic device 300. FIG. 7 includes the following steps.

Step S710: The application circuit 310 starts processing the task TSK0-0 at the time point TO. This step can correspond to the time point TO in FIG. 5 (the newly completed part DP is zero or empty).

Step S715: The processing circuit 314 starts generating a part of the image IG1-1 (which is stored in the first memory block MB0 of the memory 302).

Step S720: The application circuit 310 triggers the application circuit 330 at the time point T1. More specifically, the above preset condition is met at the time point T1; therefore, the notification sending circuit 311 sends the trigger signal TR and the progress information PI to the application circuit 330.

Step S725: The processing circuit 334 starts generating a part of the image IG2-1 (which is stored in the second memory block MB1 of the memory 302).

Step S730: The application circuit 310 terminates the task TSK0-0 at the time point T3. At this time, the first memory block MB0 stores the entire image IG1-1.

Step S735: The application circuit 310 starts processing the task TSK0-1 at the time point T4 (e.g., starts processing the image IG0-2 that follows the image IG0-1).

Step S740: The application circuit 330 terminates the task TSK1-0. At this time, the second memory block MB1 stores the entire image IG2-1.

Step S745: The application circuit 310 triggers the application circuit 330 at the time point T5. More specifically, the above preset condition is met at the time point T5; therefore, the notification sending circuit 311 sends the trigger signal TR and the progress information PI to the application circuit 330.

Step S750: The application circuit 310 terminates the task TSK0-1 at the time point T6. At this time, the second memory block MB1 stores the entire image IG1-2.

As shown in FIG. 7, because the application circuit 330 can process the image generated by the application circuit 310 in advance according to the progress information PI, the electronic device 300 of the present invention greatly reduces the hardware gap HWG and software gap SWG (the software gap SWG becomes substantially 0). As a result, the performance is improved compared to the conventional electronic device 100.

It should be noted that between the time point T1 and the time point T3, the application circuit 310 and the application circuit 330 operate substantially simultaneously (processing the task TSK0-0 and the task TSK1-0 respectively), and during this time period, the application circuit 310 continues to send the progress information PI to the application circuit 330 (e.g., sending the progress information PI-2 at the time point T2). Refer to the discussion of FIG. 4 and FIG. 5 for details.

In some embodiments, the application circuit 310 and the application circuit 330 may be a lens distortion correction (LDC) circuit and a scaler respectively. The LDC circuit is used to correct image distortion caused by different magnifications in the middle and edge of the lens. The scaler requires a minimum of merely one line of pixels from the image IG1-1 to perform scaling processing (i.e., the aforementioned threshold is one line of pixels). In other words, the minimum difference between the application circuit 310 and the application circuit 330 is merely one line of pixels, which means that the hardware gap HWG is extremely small.

In an alternative embodiment, the application circuit 310 and the application circuit 330 may be an image signal processing (ISP) circuit and an LDC circuit respectively, which will be detailed below with reference to FIG. 8. The process of FIG. 4 and related discussion are applicable to the embodiment of FIG. 8.

Figure 8:
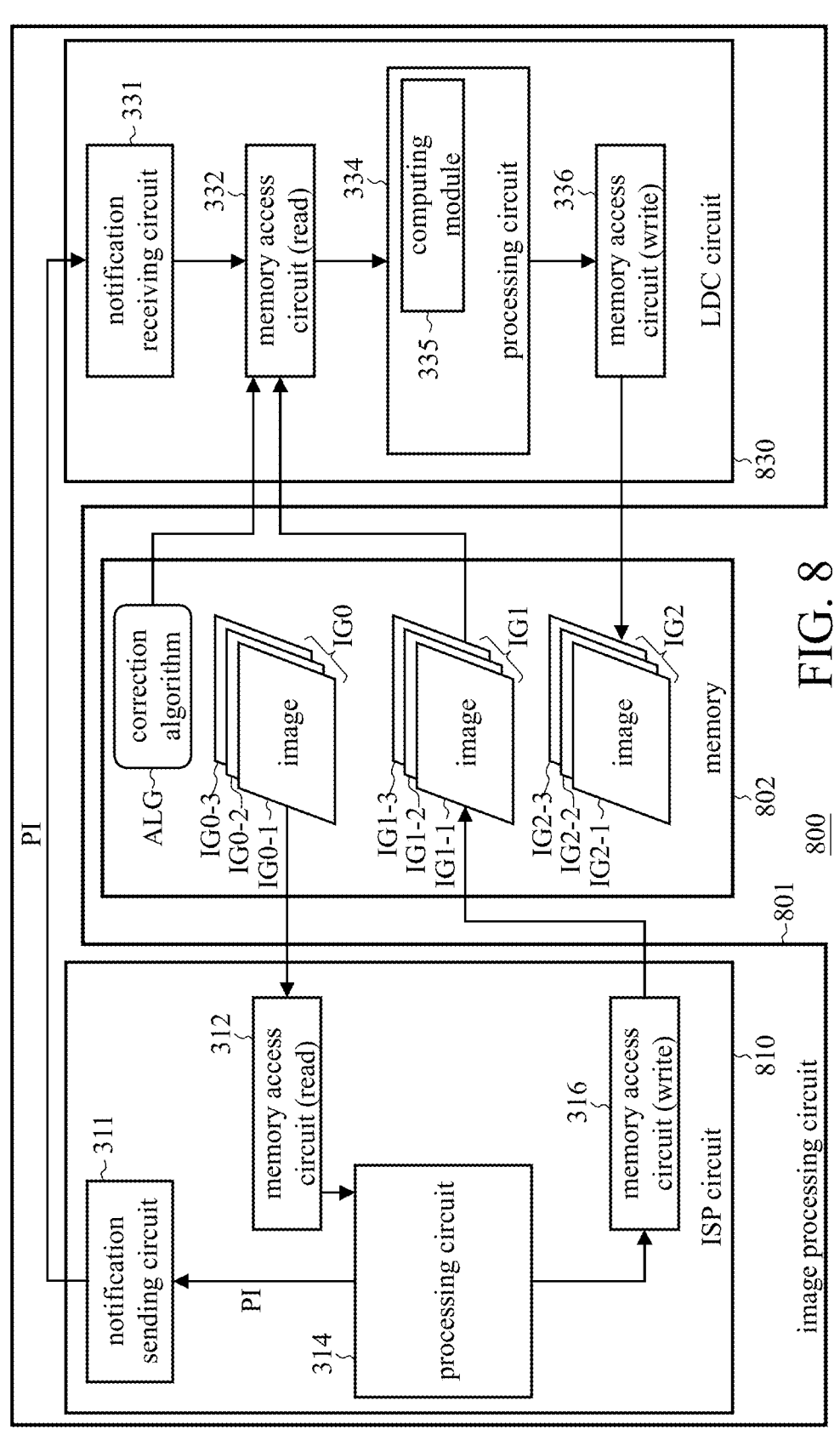
FIG. 8 is a functional block diagram of an electronic device according to another embodiment of the present invention.

Reference is made to FIG. 8, which is a functional block diagram of the electronic device according to another embodiment of the present invention. The electronic device 800 includes an image processing circuit 801 (i.e., a specific embodiment of the image processing circuit 301) and a memory 802. The image processing circuit 801 includes an ISP circuit 810 (i.e., a specific embodiment of the application circuit 310) and an LDC circuit 830 (i.e., a specific embodiment of the application circuit 330). The ISP circuit 810 is used to perform preliminary processing (including but not limited to exposure compensation, rotation and cropping, white balance, color space conversion, and image compression) on the image (e.g., the image group IG0) captured by the lens. In addition to the image groups IG0, IG1, and IG2, the memory 802 further stores the correction algorithm ALG. The memory access circuit (read) 332 further reads the correction algorithm ALG corresponding to the image IG1-1, and then the processing circuit 334 corrects the image IG1-1 according to the correction algorithm ALG.

More specifically, the processing circuit 334 includes a computing module 335. The computing module 335 calculates the corrected position of a certain pixel in the image IG1-1 based on the correction algorithm ALG, and then the processing circuit 334 fills the corrected position with the corrected pixel value based on the position information. The operations of the processing circuit 334 to generate the corrected pixel values include (but are not limited to) interpolation and color transition of the original pixels. As correcting images according to the correction algorithm ALG is well known to people having ordinary skill in the art, the details are omitted for brevity.

The correction algorithm ALG may be generated by a computing unit (not shown) of the electronic device 800 based on the original image (e.g., the image IG0-1), parameters of the photographic lens (not shown) of the electronic device 800, and/or the degree of vibration of the electronic device 800 (generated by a gyroscope (not shown)). Because the original image and the degree of vibration of the electronic device 800 are functions of time, each image has its own correction algorithm ALG. As the details of generating the correction algorithm ALG are well known to people having ordinary skill in the art and are not the key to implementing the present invention, they are omitted for brevity.

Figure 9:
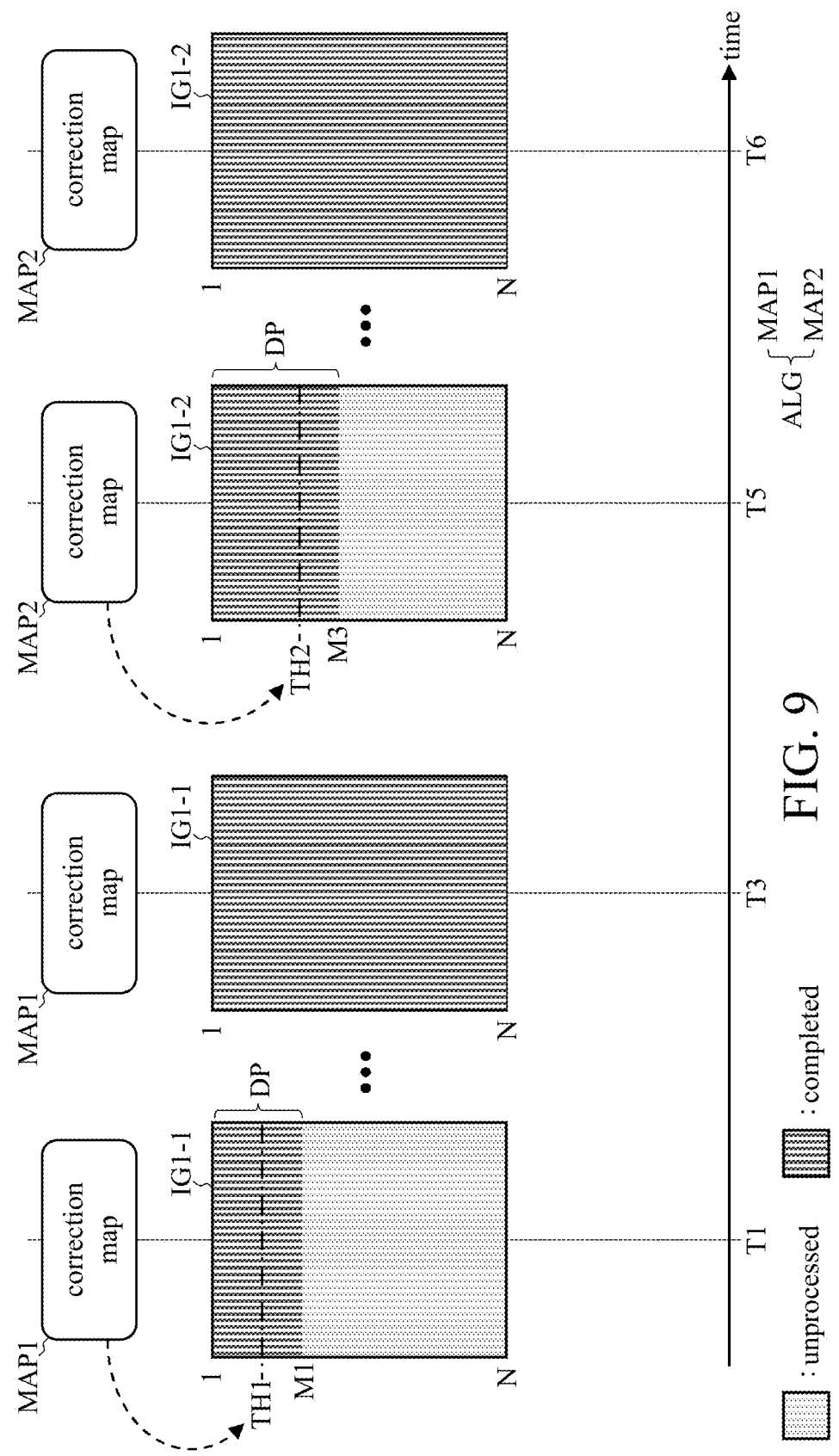
FIG. 9 is a schematic diagram illustrating the generation of images by an image signal processing (ISP) circuit of the present invention.

Different correction algorithms ALG correspond to different thresholds. For instance, please refer to FIG. 9, which is a schematic diagram illustrating the generation of the image IG1-1 and the image IG1-2 by the ISP circuit 810. The correction algorithm ALG includes the correction map MAP1 and the correction map MAP2. The image IG1-1 corresponds to the correction map MAP1, and the image IG1-2 corresponds to the correction map MAP2. The correction map MAP1 differs from the correction map MAP2, and the correction map MAP1 and the correction map MAP2 respectively contain the threshold TH1 and the threshold TH2, which are different. It should be noted that in FIG. 9, the intervals between time points are for illustration only and do not reflect the actual time length. Reference is made to both FIG. 7 and FIG. 9. The LDC circuit 830 learns from the correction map MAP1 (or MAP2) that it needs to wait until the ISP circuit 810 completes at least TH1 (or TH2) line(s) of pixels before it can start correcting the image IG1-1 (or IG1-2) (roughly corresponding to the time point T1 (or T5) in FIG. 7).

Figure 10:
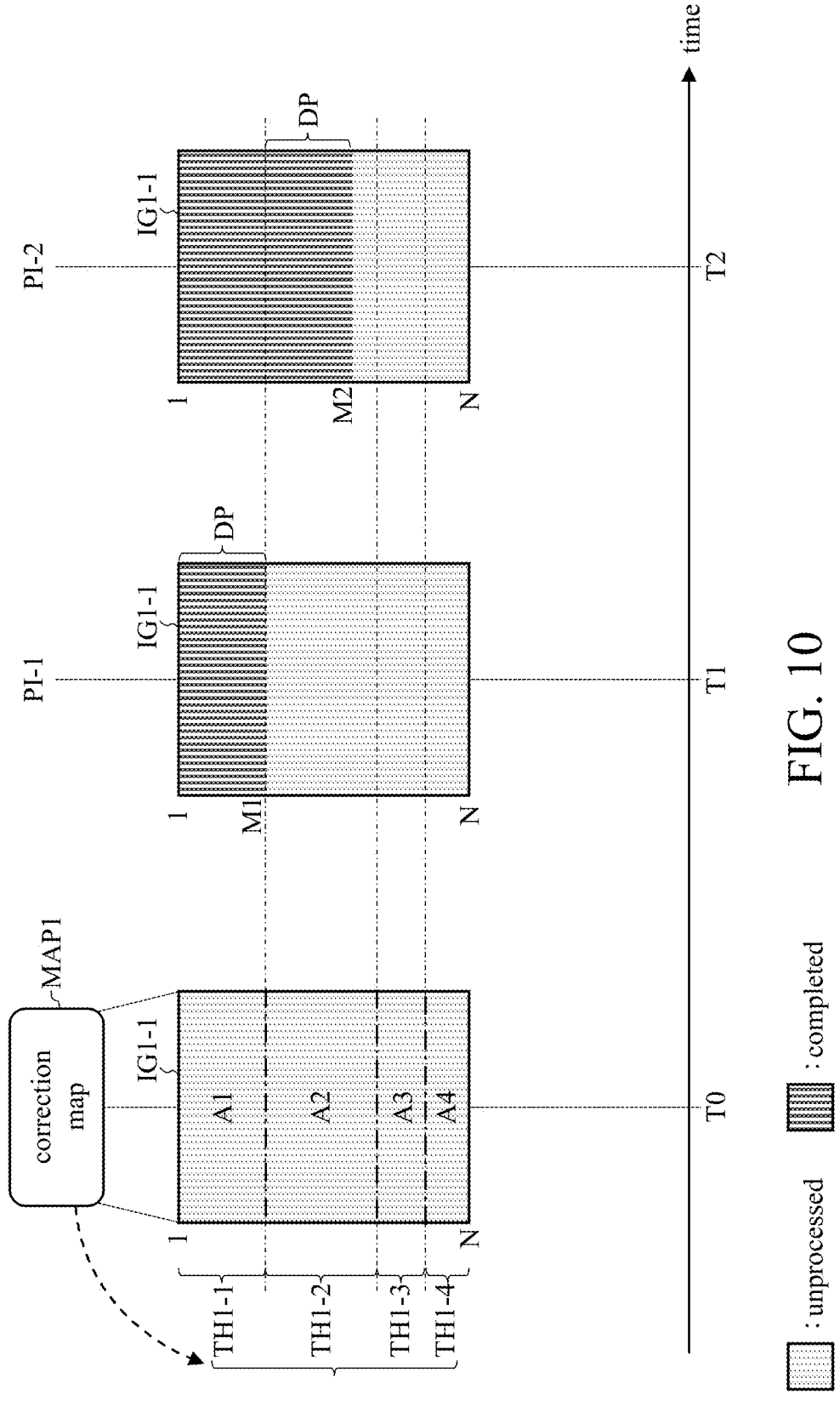
FIG. 10 is a schematic diagram illustrating the generation of images by an ISP circuit according to another embodiment of the present invention.

Reference is made to FIG. 10, which is a schematic diagram illustrating the generation of the image IG1-1 by the ISP circuit 810 according to another embodiment of the present invention. FIG. 10 corresponds to the embodiment of FIG. 8. Because the degree of distortion differs across various coordinates in each image frame, the correction algorithm ALG typically subdivides an image frame into many blocks according to the degree of distortion. For example, the correction map MAP1 of the image IG1-1 vertically divides the image IG1-1 into four correction areas (A1 to A4). Each of these correction areas has respective thresholds TH1-1, TH1-2, TH1-3, and TH1-4, which represent the height of each correction area. The LDC circuit 830 cannot begin correcting the correction area A1 (A2, A3, or A4) until it obtains all pixels (i.e., TH1-1 (TH1-2, TH1-3, or TH1-4) line(s) of pixels) of that area.

More specifically, at the time point T1, the LDC circuit 830 learns from the progress information PI-1 and the correction map MAP1 that the newly completed part DP (M1 lines of pixels) is greater than or equal to the threshold TH1-1; therefore, the LDC circuit 830 may begin correcting the image IG1-1. At the time point T2, the LDC circuit 830 learns from the progress information PI-2 and the correction map MAP1 that the newly completed part DP (M2-M1 line(s) of pixels) is not greater than or equal to the threshold TH1-2 (i.e., M2-M1<TH1-2); therefore, the LDC circuit 830 is unable to correct the correction area A2 of the image IG1-1 at the time point T2 (for example, the notification receiving circuit 331 may temporarily refrain from controlling the memory access circuit (read) 332 to read the newly completed part DP from the memory 802).

Various functional components or blocks have been described herein. As appreciated by persons skilled in the art, in some embodiments, the functional blocks can preferably be implemented through circuits (either dedicated circuits, or general purpose circuits, which operate under the control of one or more processors and coded instructions), which typically comprise transistors or other circuit elements that are configured in such a way as to control the operation of the circuitry in accordance with the functions and operations described herein. As further appreciated by persons skilled in the art, the specific structure or interconnections of the circuit elements can typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The ISP circuit, LDC circuit, and scaler are intended to illustrate the invention by way of example and not to limit the scope of the claimed invention. People having ordinary skill in the art may apply the present invention to other types of application circuits in accordance with the foregoing discussions.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An image processing circuit coupled to a memory, the image processing circuit comprising:
   a first application circuit, comprising:
      a first memory access circuit configured to read a first image from the memory;
      a first processing circuit coupled to the first memory access circuit and configured to process the first image to generate a part of a second image and generate progress information corresponding to the part;
      a second memory access circuit coupled to the first processing circuit and configured to store the part of the second image in the memory; and
      a notification sending circuit coupled to the first processing circuit and configured to send the progress information; and
   a second application circuit, comprising:
      a notification receiving circuit coupled to the notification sending circuit and configured to receive the progress information;
      a third memory access circuit coupled to the notification receiving circuit and configured to read the part of the second image from the memory according to the progress information; and
      a second processing circuit coupled to the third memory access circuit and configured to process the part of the second image.

2. The image processing circuit of claim 1, wherein when the progress information indicates that the number of lines in the part is greater than or equal to a threshold, the notification receiving circuit controls the third memory access circuit to read the part of the second image from the memory.

3. The image processing circuit of claim 2, wherein the first application circuit is an image signal processing (ISP) circuit, the second application circuit is a lens distortion correction (LDC) circuit, the memory further stores a correction algorithm, the correction algorithm divides the second image into a plurality of correction areas, and the threshold is the number of lines of one of the correction areas.

4. The image processing circuit of claim 3, wherein the threshold is a first threshold, the correction algorithm comprises a first correction map and a second correction map, the first correction map comprises the first threshold, the first processing circuit further generates a third image, the third image is different from the second image, the first image corresponds to the first correction map, the third image corresponds to the second correction map, the second correction map comprises a second threshold, and the second threshold is not equal to the first threshold.

5. The image processing circuit of claim 2, wherein the first application circuit is a lens distortion correction (LDC) circuit, the second application circuit is a scaler, and the threshold is equal to one.

6. The image processing circuit of claim 1, wherein the second image comprises N lines of pixels, the progress information indicates that the first processing circuit has processed M lines of pixels of the second image, both N and M are positive integers, and M is smaller than N.

7. The image processing circuit of claim 1, wherein each time the first processing circuit generates a preset number of lines of the second image, the notification sending circuit sends the progress information once.

8. The image processing circuit of claim 1, wherein the notification sending circuit sends the progress information every predetermined time.

9. The image processing circuit of claim 1, wherein the notification sending circuit comprises:

an information recorder coupled to the first processing circuit and configured to receive the progress information and send the progress information; and an event sender coupled to the information recorder and configured to generate a trigger signal; and the notification receiving circuit comprises:

an information decoder coupled to the information recorder and configured to receive the progress information;

an event receiver coupled to the event sender and the information decoder and configured to control, in response to the trigger signal, the information decoder to decode the progress information.

10. The image processing circuit of claim 9, wherein when a predetermined time has elapsed or the progress information indicates that the number of lines of the part of the second image is greater than or equal to a preset number of lines, the information recorder sends the progress information and controls the event sender to generate the trigger signal.

11. An image processing method applied to an image processing circuit comprising a first application circuit and a second application circuit, wherein the image processing circuit is coupled to a memory, the image processing method comprising:

reading, by the first application circuit, a first image from the memory;

processing, by the first application circuit, the first image to generate a part of a second image and progress information corresponding to the part;

storing, by the first application circuit, the part of the second image in the memory;

sending, by the first application circuit, the progress information;

receiving, by the second application circuit, the progress information;

reading, by the second application circuit, the part of the second image from the memory according to the progress information; and processing, by the second application circuit, the part of the second image.

12. The image processing method of claim 11, wherein when the progress information indicates that the number of lines in the part is greater than or equal to a threshold, the second application circuit reads the part of the second image from the memory.

13. The image processing method of claim 12, wherein the first application circuit is an image signal processing (ISP) circuit, the second application circuit is a lens distortion correction (LDC) circuit, the memory further stores a correction algorithm, the correction algorithm divides the second image into a plurality of correction areas, and the threshold is the number of lines of one of the correction areas.

14. The image processing method of claim 13, wherein the threshold is a first threshold, the correction algorithm comprises a first correction map and a second correction map, the first correction map comprises the first threshold, the first application circuit further generates a third image, the third image is different from the second image, the first image corresponds to the first correction map, the third image corresponds to the second correction map, the second correction map comprises a second threshold, and the second threshold is not equal to the first threshold.

15. The image processing method of claim 12, wherein the first application circuit is a lens distortion correction (LDC) circuit, the second application circuit is a scaler, and the threshold is equal to one.

16. The image processing method of claim 11, wherein the second image comprises N lines of pixels, the progress information indicates that the first application circuit has processed M lines of pixels of the second image, both N and M are positive integers, and M is smaller than N.

* * * * *